(12) United States Patent
Kawasaki

(10) Patent No.: US 6,626,481 B2
(45) Date of Patent: Sep. 30, 2003

(54) VEHICULAR SEAT SYSTEM

(75) Inventor: Teruo Kawasaki, Kanagawa (JP)

(73) Assignee: Kasai Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 09/874,385

(22) Filed: Jun. 6, 2001

(65) Prior Publication Data

US 2002/0047287 A1 Apr. 25, 2002

(30) Foreign Application Priority Data

Jun. 8, 2000 (JP) ........................................ 2000-172516

(51) Int. Cl.[7] .................................................. A47C 9/06
(52) U.S. Cl. ...................... 296/65.1; 297/326; 297/257; 297/15; 296/65.09; 296/65.05
(58) Field of Search ................................. 297/326, 325, 297/15, 237, 235, 354.12, 354.13, 344.1, 378.1, 248, 243; 296/64, 65.09, 65.05, 65.1

(56) References Cited

U.S. PATENT DOCUMENTS

| | | | | |
|---|---|---|---|---|
| 4,932,709 A | * | 6/1990 | Wainwright | ............. 296/65.09 |
| 4,971,390 A | * | 11/1990 | McGinley | .............. 297/188.11 |
| 5,492,386 A | * | 2/1996 | Callum | ........................ 296/64 |
| 5,816,650 A | * | 10/1998 | Lucas, Jr. | ................ 297/188.1 |
| 6,000,174 A | * | 12/1999 | Yamazaki | ................... 297/235 |
| 6,129,404 A | * | 10/2000 | Mattarella et al. | ....... 296/65.09 |
| 6,406,084 B1 | * | 6/2002 | de Campos et al. | .......... 296/66 |

* cited by examiner

Primary Examiner—Peter M. Cuomo
Assistant Examiner—Erika Garrett
(74) Attorney, Agent, or Firm—Foley & Lardner

(57) ABSTRACT

A front seat 2 is divided into a driver seat 2a and a front passenger seat 2b, a second-row seat 3 and a rearmost seat 4 are divided into a first seat 3a, 4a and a second seat 3b, 4b, the front passenger seat 2b and the second seat 4b of the rearmost seat 4 are configured so as to be foldable, and the second seat 3b of the second-row seat 3 is configured so as to be movable to the vicinity of the driver seat 2a and to the vicinity of the first seat 4a of the rearmost seat 4. Therefore, infants seated on the first seats 3a and 4a of the second-row seat 3 and the rearmost seat 4 can easily be taken care of and communicated with. Also, by moving the second seat 3b of the second-row seat to the vicinity of the driver seat 2a, communication with a driver can be provided easily.

9 Claims, 10 Drawing Sheets

VEHICULAR SEAT SYSTEM

CROSS-REFERENCES TO RELATED APPLICATION

This application claims all benefits accruing under Paris Convention from the Japanese Patent Application No. 2000-172516, filed Jun. 8, 2000.

BACKGROUND OF THE INVENTION

1. Field of the Invention

The present invention relates to a vehicular seat system in which a seat in the second row can be moved to the vicinity of a front seat and to the vicinity of a rearmost seat.

2. Description of Related Art

Conventionally, there has publicly been known a motor vehicle, such as a minivan, in which seats of three or more rows are provided, and the arrangement of each seat can be changed freely or a walk-through is provided between seats of each row to facilitate movement from a front seat to a rear seat.

Also, there has publicly been known a seat system in which by folding a passenger seat of the front seat, the second-row seat can be moved to the vicinity of a driver seat to facilitate communication between a driver and a passenger on the second-row seat.

On a vehicle having seats of three or more rows, such as a minivan, an infant is often seated on a seat in the second or rearward row for safety. Conventionally, however, there has been only a seat system in which the second-row seat can be moved to the vicinity of the driver seat, or in which the front passenger seat can be moved to the vicinity of the second-row seat. In the case where, for example, infants seated on a plurality of seats in the second and rearward rows are taken care of and are communicated with, therefore, a passenger must move in a cabin by utilizing the walk-through, so that it is difficult to take care of and communicate with infants during the running of the vehicle.

The present invention has been made to solve the problems with the related art, and accordingly an object thereof is to provide a vehicular seat system in which a seat in the second row can be moved to the vicinity of a front seat and to the vicinity of the rearmost seat in order for a passenger to easily take care of infants seated on the seats in the second and rearward rows and to easily communicate with a driver and infants.

BRIEF SUMMARY OF THE INVENTION

To achieve the above object, the present invention provides a vehicular seat system provided with seats of at least three rows of a front seat, a second-row seat, and a rearmost seat, in which the second-row seat and the rearmost seat are divided into a first seat and a second seat, the second seat of the rearmost seat is configured so as to be capable of being folded, and the second seat of the second-row seat is configured so as to be capable of being moved to the vicinity of the first seat of the rearmost seat.

According to the above-described configuration, infants seated on the first seat of the second-row seat and the first seat of the rearmost seat can easily be taken care of and communicated with.

To achieve the above object, the present invention provides a vehicular seat system provided with seats of at least three rows of a front seat, a second-row seat, and a rearmost seat, in which the front seat is divided into a driver seat and a front passenger seat, the second-row seat and the rearmost seat are divided into a first seat and a second seat, and the front passenger seat and the second seat of the rearmost seat are configured so as to be foldable so that the second seat of the second-row seat may be moved to the vicinity of the driver seat and to the vicinity of the first seat of the rearmost seat.

According to the above-described configuration, infants seated on the first seat of the second-row seat and the first seat of the rearmost seat can easily be taken care of and communicated with. Also, by moving the second seat of the second-row seat to the vicinity of the driver seat, communication with a driver can be provided easily.

To achieve the above object, in the vehicular seat system in accordance with the present invention, a seat storage chamber capable of storing either or both of the divided first and second seats is provided behind the rearmost seat.

According to the above-described configuration, the second seat of the rearmost seat can be folded and stored in the seat storage chamber, so that the second seat of the second-row seat does not interfere with the second seat of the rearmost seat. Also, the first and second seats of the rearmost seat can be stored in the seat storage chamber, so that a wide luggage room can be formed at the rear part of the vehicle, and thus a large piece of luggage can be stored easily.

To achieve the above object, in the vehicular seat system in accordance with the present invention, a base plate of a size such as to be capable of covering an opening of the seat storage chamber is provided on a floor under the rearmost seat, the rear end of the base plate is hingedly fixed to a position near the front part of the seat storage chamber, the first seat of the rearmost seat is fixed onto the base plate, and the second seat is pivotally fixed to the rear part of the base plate by means of pins.

According to the above-described configuration, by turning the base plate rearward around the hinges to store the first and second seats of the rearmost seat in the seat storage chamber, the base plate covers the opening of the seat storage chamber, so that a luggage room substantially flush with the floor can be provided. Thereby, luggage can be put in and taken out of the luggage room easily. Also, if the second seat of the rearmost seat is stored in the seat storage chamber, the bottom surface of the seat cushion of the stored second seat is substantially flush with the floor, so that a long piece of luggage can be stored easily.

To achieve the above object, in the vehicular seat system in accordance with the present invention, guide rails for movably supporting the second seat of the second-row seat are laid on the floor, and the guide rails are inclined with respect to the running direction of the vehicle so that the front ends thereof are shifted toward the vehicle side and the rear ends thereof are shifted toward the vehicle center.

According to the above-described configuration, the second seat of the second-row seat can be moved smoothly in the longitudinal direction along the guide rails. If the second seat of the second-row seat is moved rearward, it can come closer to the first seat of the rearmost seat. Thereby, the infant seated on the first seat of the rearmost seat can easily be taken care of and communicated with, and also the second seat of the second-row seat can be prevented from interfering with the tire house located at the side of the second seat of the rearmost seat.

Also, if the second seat of the second-row seat is moved frontward, the second seat of the second-row seat shifts toward the vehicle side. Therefore, a wide space can be secured between the second seat of the second-row seat and the driver seat, so that a console box or the like can easily be provided in this space.

To achieve the above object, in the vehicular seat system in accordance with the present invention, the seat storage chamber is provided on the floor in a recessed manner so as to have a shallow step portion at the front part thereof, and a drawer is provided in the step portion so as to be openable freely.

According to the above-described configuration, by opening the drawer away from the step portion of the seat storage chamber, small articles can be stored in the drawer, by which small articles can be prevented from scattering in the luggage room during the running of the vehicle.

DETAILED DESCRIPTION OF THE INVENTION

An embodiment of the present invention will be described in detail with reference to the accompanying drawings.

Figure 1:
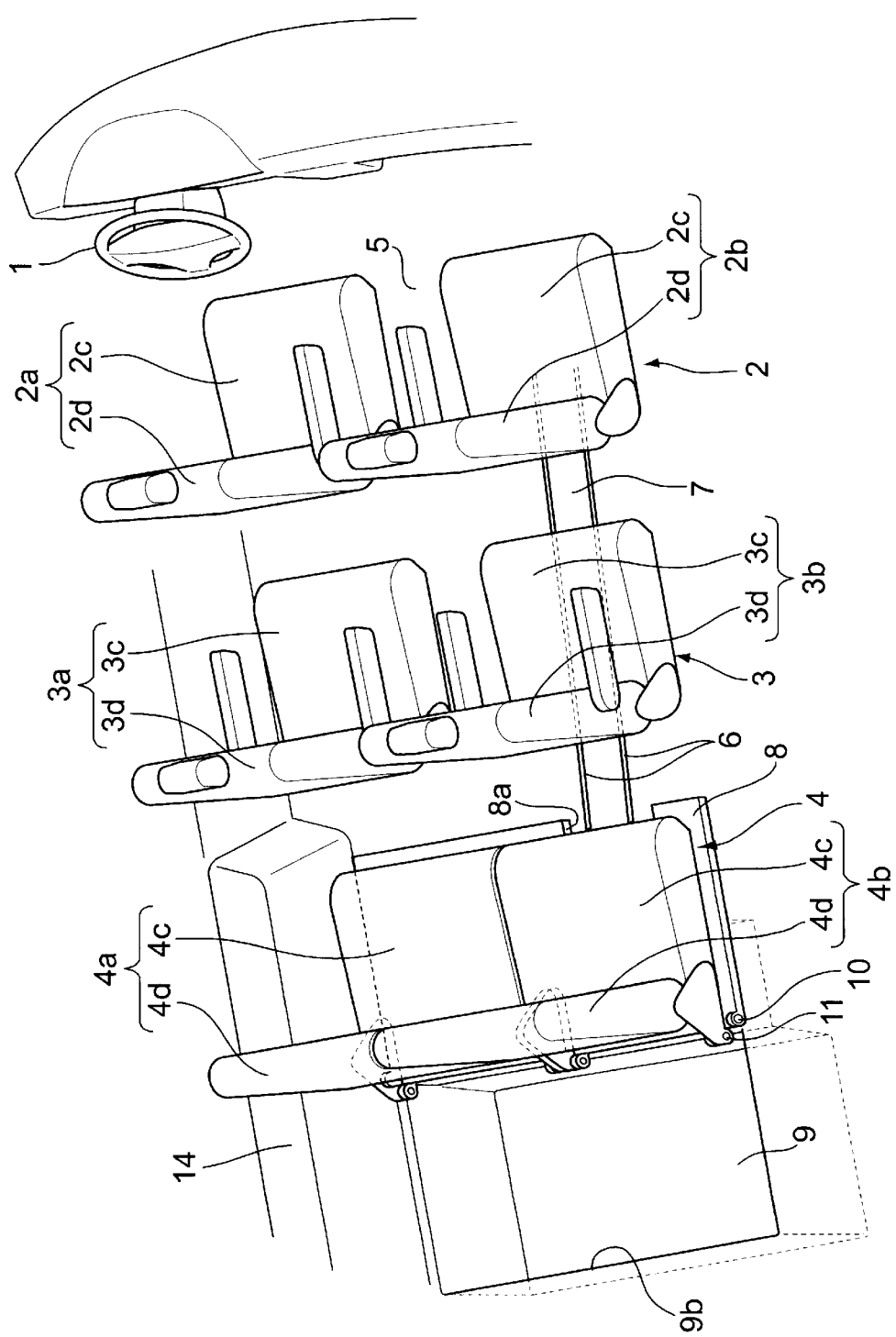
FIG. 1 is a general perspective view showing a vehicular seat system in accordance with an embodiment of the present invention.

FIG. 1 is a perspective view showing the interior of a cabin of a vehicle such as a minivan. In the cabin, there are arranged a front seat 2 consisting of a driver seat 2a provided behind a steering wheel 1 and a front passenger seat 2b provided at the side of the driver seat 2a, and a seat 3 in the second row and a seat 4 in the rearmost row which are provided behind the front seat 2 with a proper clearance therebetween.

Figure 8:
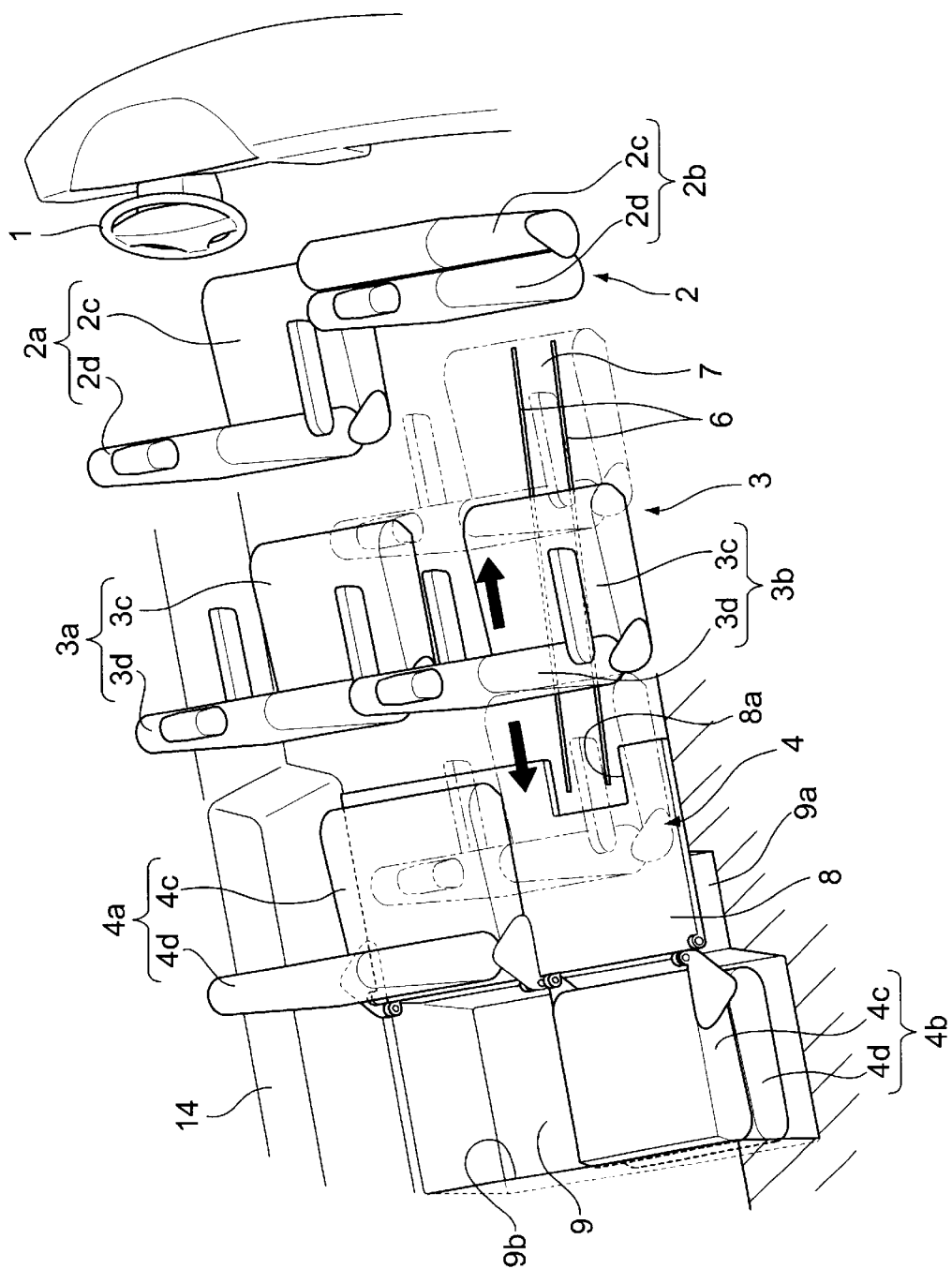
FIG. 8 is a perspective view showing a state at the time when a second seat in the second row is moved longitudinally by a vehicular seat system in accordance with an embodiment of the present invention.

The front seat 2 is divided into the driver seat 2a and the front passenger seat 2b, and the second-row seat 3 and the rearmost seat 4 are divided into a first seat 3a, 3b and a second seat 4a, 4b, respectively. Between the driver seat 2a and the front passenger seat 2b and between the first seat 3a, 4a and the second seat 3b, 4b, there is provided a walk-through 5 for a passenger to move by walking. The front passenger seat 2b of the front seat 2 is configured so as to be foldable as shown in FIG. 8 by erecting a seat cushion 2c along a seat back 2d.

Also, under the second seat 3b of the second-row seat 3 located behind the front passenger seat 2b, a pair of guide rails 6 are laid on a floor 7 in parallel with each other with a distance therebetween in the vehicle width direction.

The guide rails 6 are laid in an inclined manner with respect to the running direction of the vehicle so that the front ends thereof are shifted toward the vehicle side and the rear ends thereof are shifted toward the vehicle center. Also, the front ends of the guide rails 6 reach a position under the front passenger seat 2b, and the rear ends thereof reach a position under the second seat 4b of the rearmost seat 4. The second seat 3b of the second-row seat 3 is supported on the guide rails 6 so as to be movable longitudinally.

On the other hand, under the rearmost seat 4 is provided a base plate 8 on the floor 7. Behind the base plate 8, a seat storage chamber 9 having a shallow step portion 9a on the front side thereof is formed by recessing the floor 7 into two steps.

The base plate 8 is formed of a plate material of a size such as to be capable of covering an upper opening 9b of the seat storage chamber 9 from the upside. The rear end of the base plate 8 is hingedly fixed to the floor 7 or the like in front of the seat storage chamber 9 by using hinges 10, and at the front edge of the base plate 8, a notch 8a is formed in a portion lapping on the guide rails 6. Therefore, when the second seat 3b of the second-row seat 3 is moved to the vicinity of the first seat 4a of the rearmost seat 4, the second seat 3b of the second-row seat 3 is prevented from interfering with the base plate 8.

Over the base plate 8 is provided the rearmost seat 4. For the first seat 4a of the rearmost seat 4, the bottom thereof is fixed to the upper surface of the base plate 8 via a bracket 8b. For the second seat 4b, the rear part of a seat cushion 4c is pivotally fixed to the rear end of the base plate 8 by means of pins 11. Therefore, the second seat 4b is turned rearward around the pins 11 in a state in which a seat back 4d is folded on the seat cushion 4c, by which the second seat 4b can be stored in the seat storage chamber 9 at the rear thereof.

The following is a description of the operation of the vehicular seat system configured as described above. When all seats in the cabin are used, seat backs 2d, 3d, and 4d of seats 2, 3, and 4 of all rows are erected as shown in FIG. 1.

In this state, the seat storage chamber 9 behind the rearmost seat 4 can be used as a luggage storage chamber. If the seat storage chamber 9 is not used, the upper opening 9b may be covered with a tonneau cover (not shown).

Figure 3:
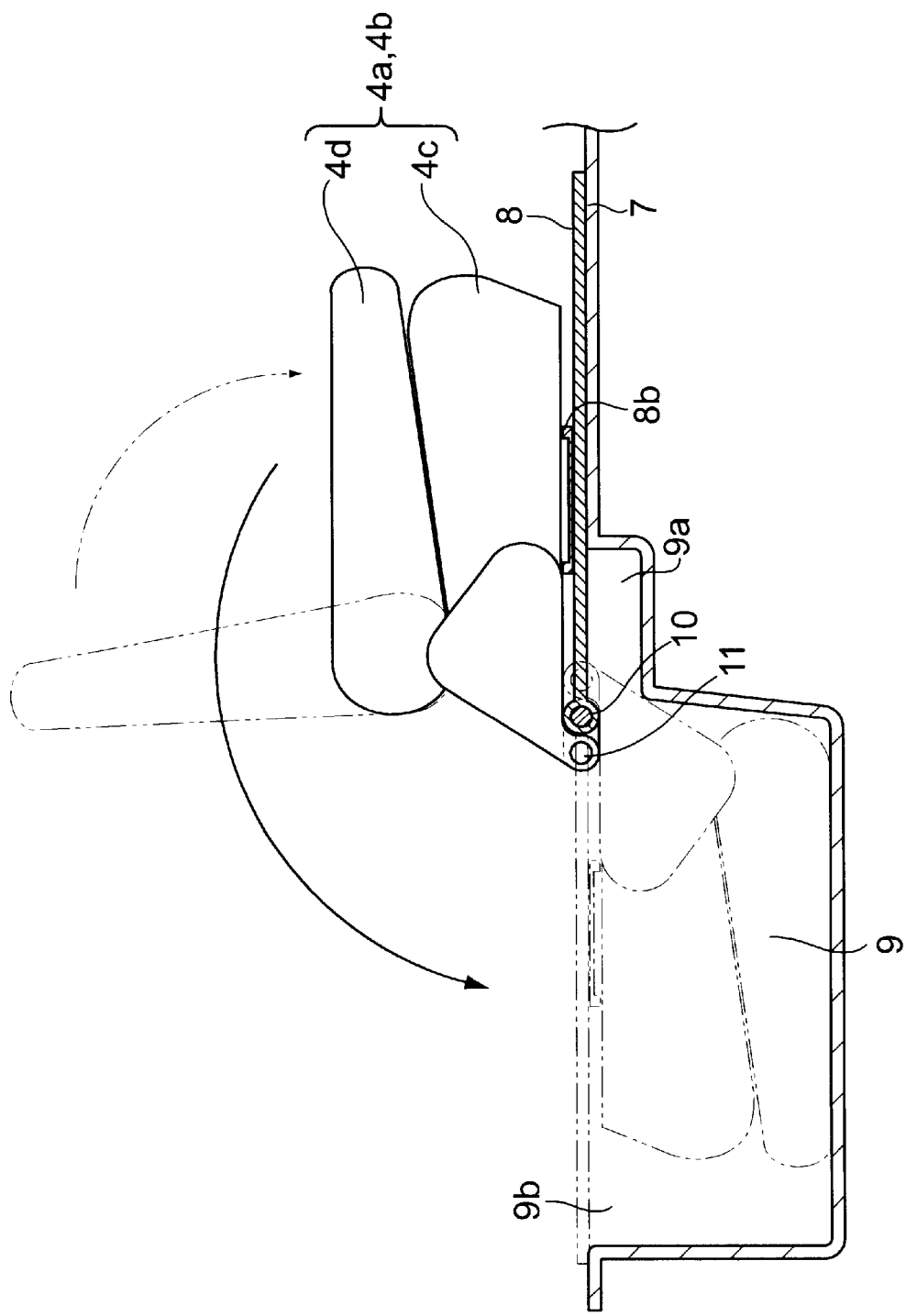
FIG. 3 is an explanatory view of an operation at the time when first and second seats in the rearmost row are stored by a vehicular seat system in accordance with an embodiment of the present invention.
Figure 6:
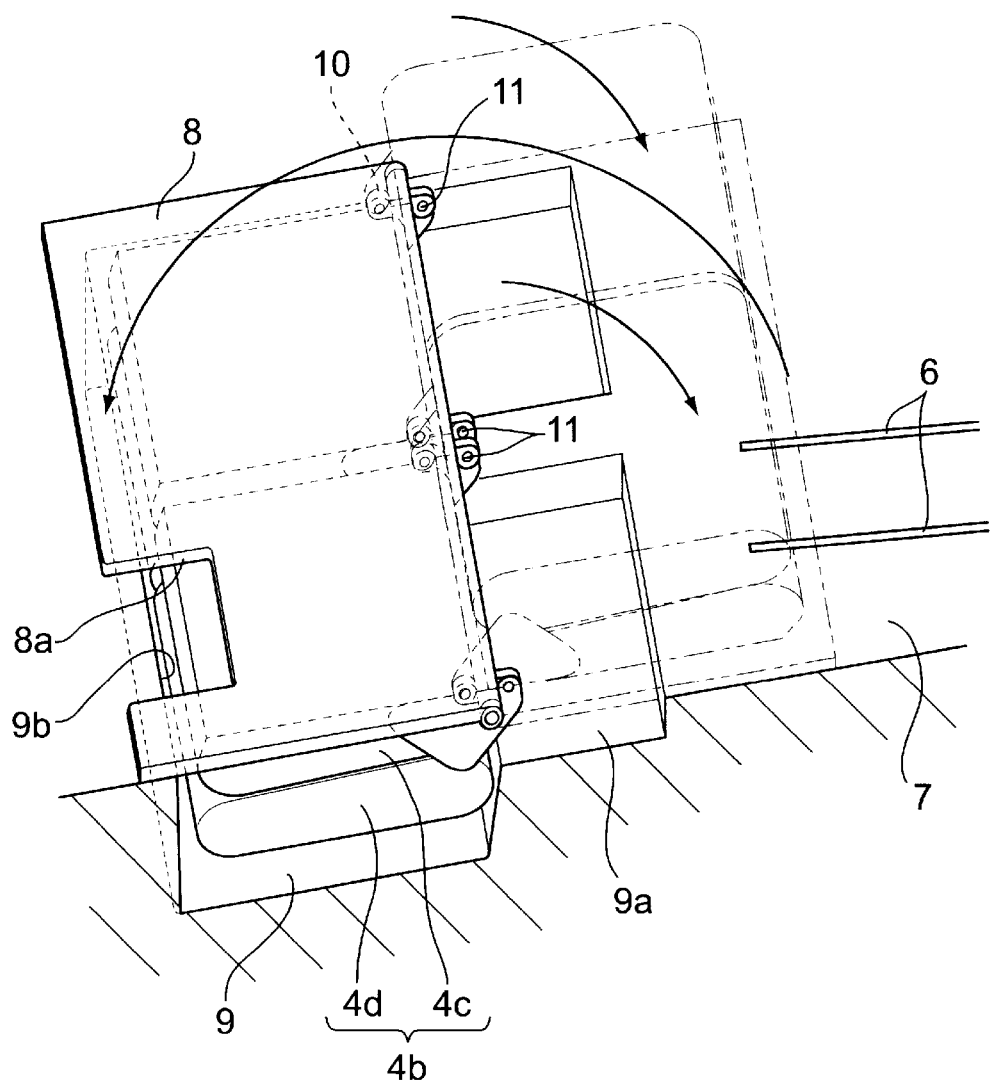
FIG. 6 is an enlarged perspective view showing a state in which first and second seats in the rearmost row are stored by a vehicular seat system in accordance with an embodiment of the present invention.

On the other hand, when it is to be desired that a wide luggage room be secured without the use of the rearmost seat 4, the seat back 4d of the rearmost seat 4 is folded on the seat cushion 4c as shown in FIG. 3, and the base plate 8 is turned rearward around the hinges 10 in this state, by which the rearmost seat 4 is stored in the seat storage chamber 9 as shown in FIG. 6.

Figure 2:
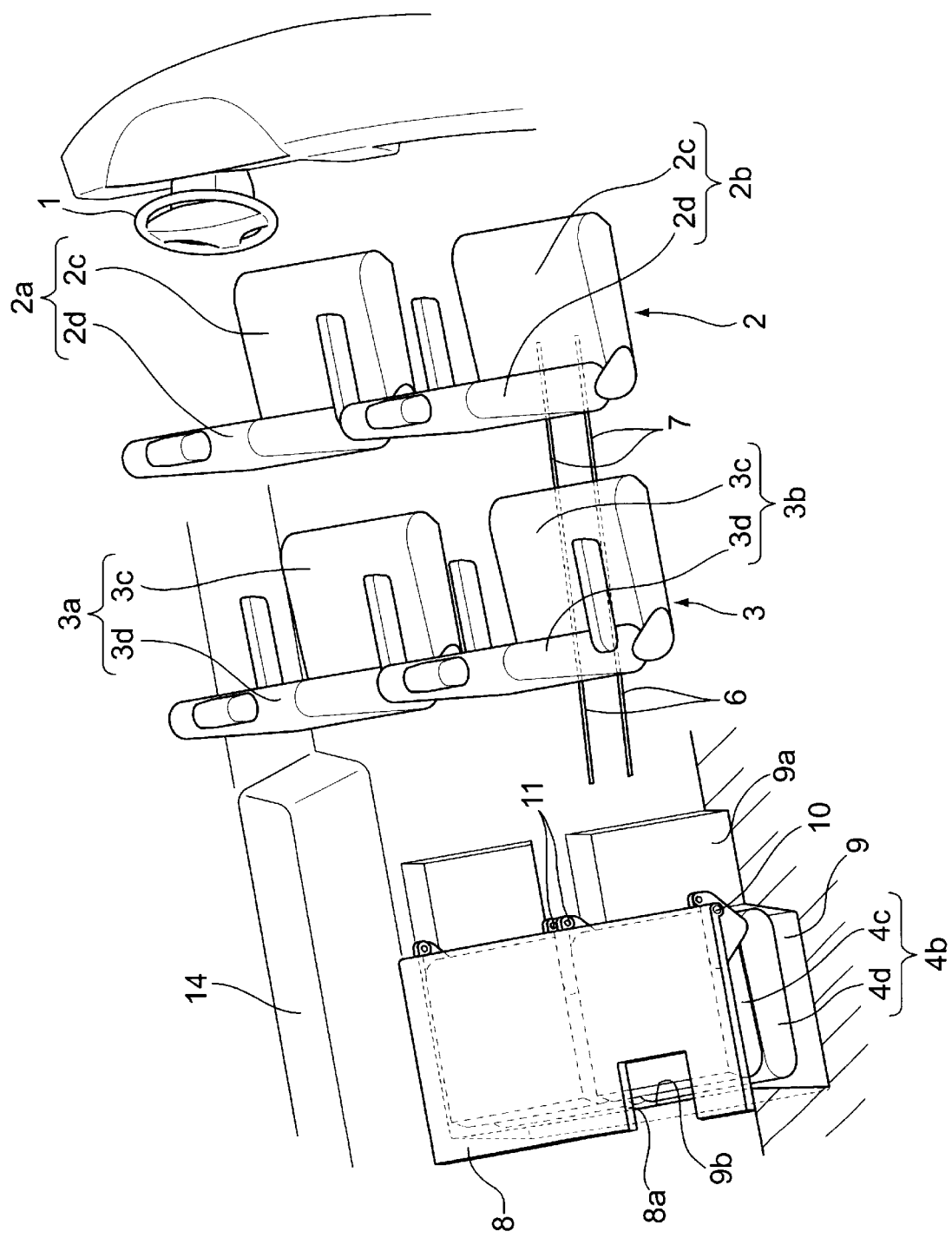
FIG. 2 is a perspective view showing a state in which first and second seats in the rearmost row are stored by a vehicular seat system in accordance with an embodiment of the present invention.

Thereby, the upper opening 9b of the seat storage chamber 9 is covered by the base plate 8, so that a wide luggage room can be secured behind the second-row seat 3 as shown in FIG. 2.

Also, since the rearmost seat 4 is divided into the first seat 4a and the second seat 4b, only the second seat 4b can be stored in the seat storage chamber 9.

Figure 5:
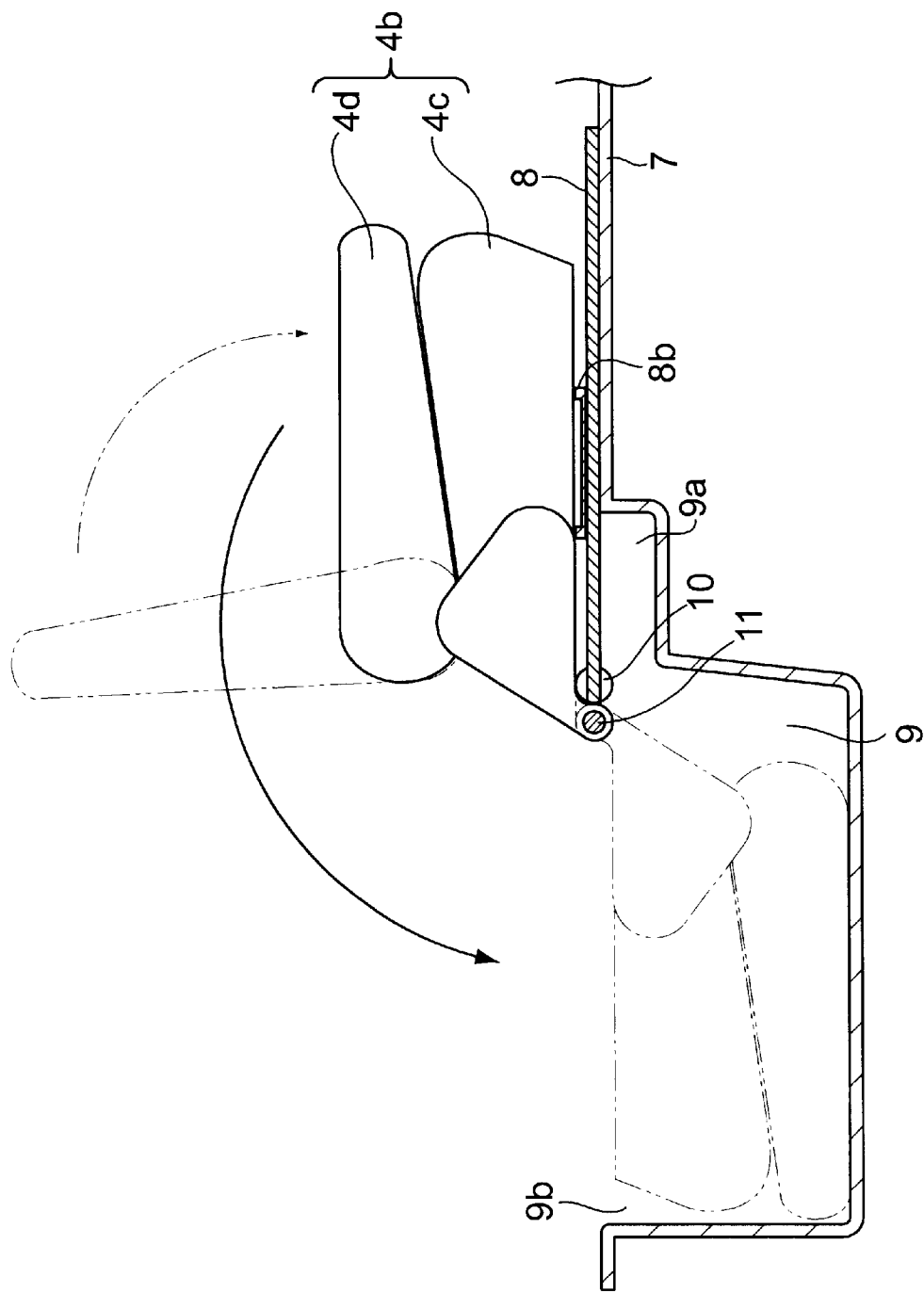
FIG. 5 is an explanatory view of an operation at the time when a second seat in the rearmost row is stored by a vehicular seat system in accordance with an embodiment of the present invention.
Figure 7:
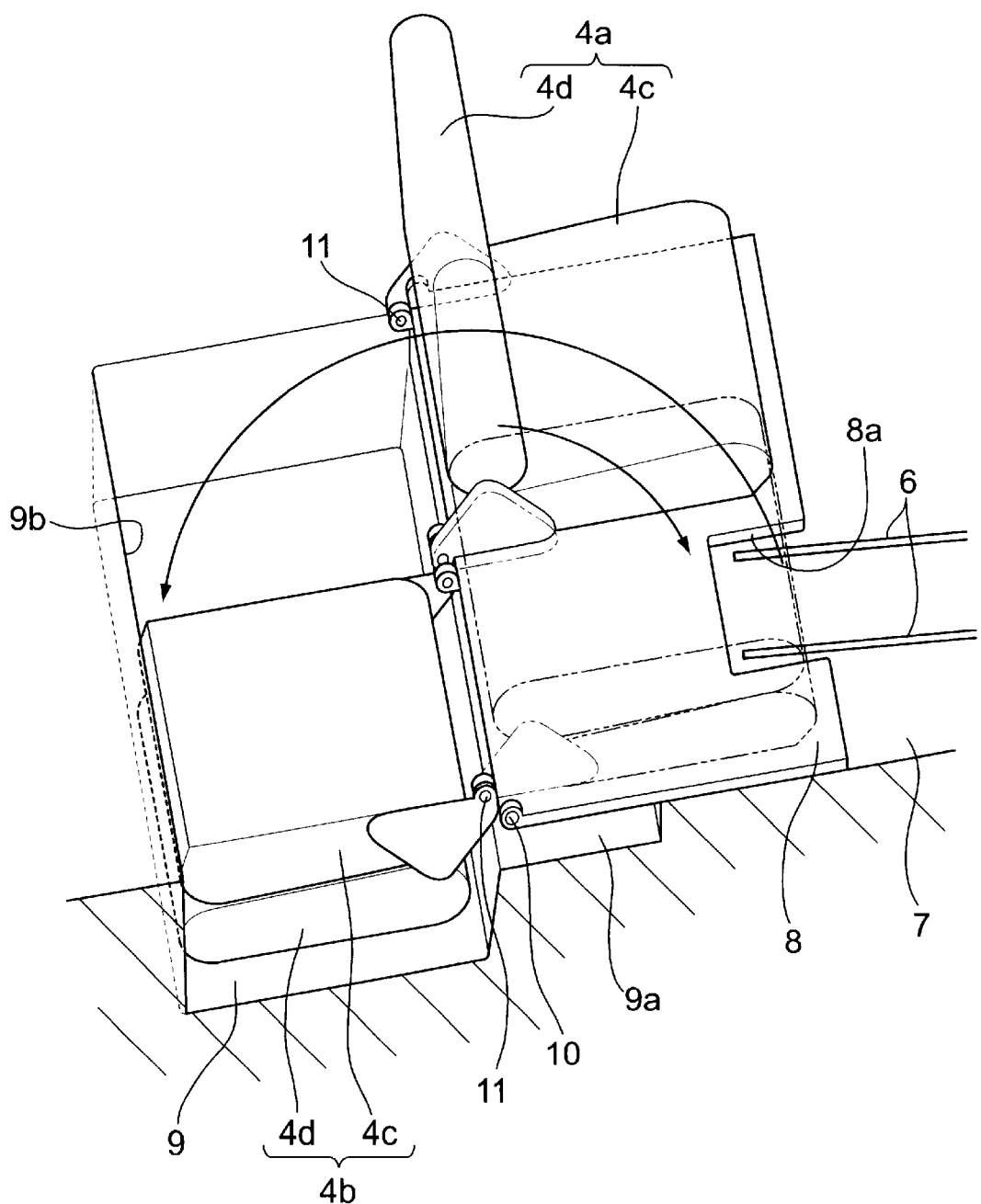
FIG. 7 is an enlarged perspective view showing a state in which a second seat in the rearmost row is stored by a vehicular seat system in accordance with an embodiment of the present invention.

Specifically, the seat back 4d of the rearmost seat 4 is folded on the seat cushion 4c as shown in FIG. 5, and the second seat 4b is turned rearward around the pins 11, by which the second seat 4b is stored in the seat storage chamber 9 as shown in FIG. 7.

Figure 4:
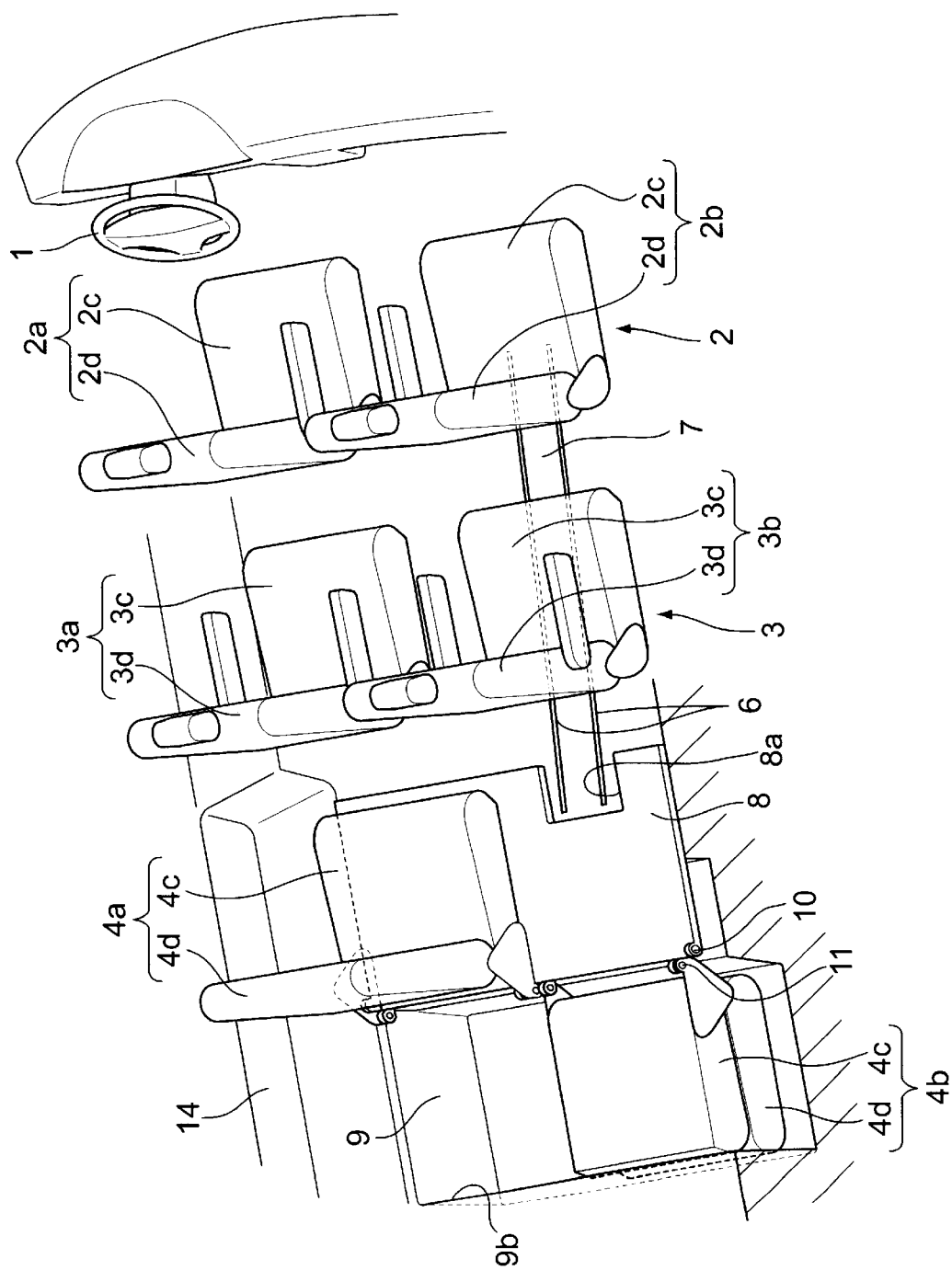
FIG. 4 is a perspective view showing a state in which a second seat in the rearmost row is stored by a vehicular seat system in accordance with an embodiment of the present invention.

Thereby, the bottom surface of the seat cushion 4c is made substantially flush with the floor 7, so that a substantially L-shaped luggage room is formed at the side and rear of the rearmost seat 4 as shown in FIG. 4. Therefore, a long or tall piece of luggage can be stored. Also, if the second seat 3b of the second-row seat 3 is moved rearward in this state, the second seat 3b reaches a location near the side of the second seat 4a of the rearmost seat 4. As a result, for example, when infants are seated on the first seats 3a and 4a of the second-row seat 3 and the rearmost seat 4, a mother seated on the second seat 3b of the second-row seat 3 can easily take care of and communicate with infants seated on the first seat 3a of the second-row seat 3 and the first seat 4a of the rearmost seat 4. Also, since the guide rails 6 for movably supporting the second seat 3b of the second-row seat 3 are laid so that the rear ends thereof are shifted toward the vehicle center, the second seat 3b does not interfere with a tire house 14. Further, since the second seat 3b comes close to the first seat 4a of the rearmost seat 4, the mother can take care of the infant seated on the first seat 4a more easily.

Figure 9:
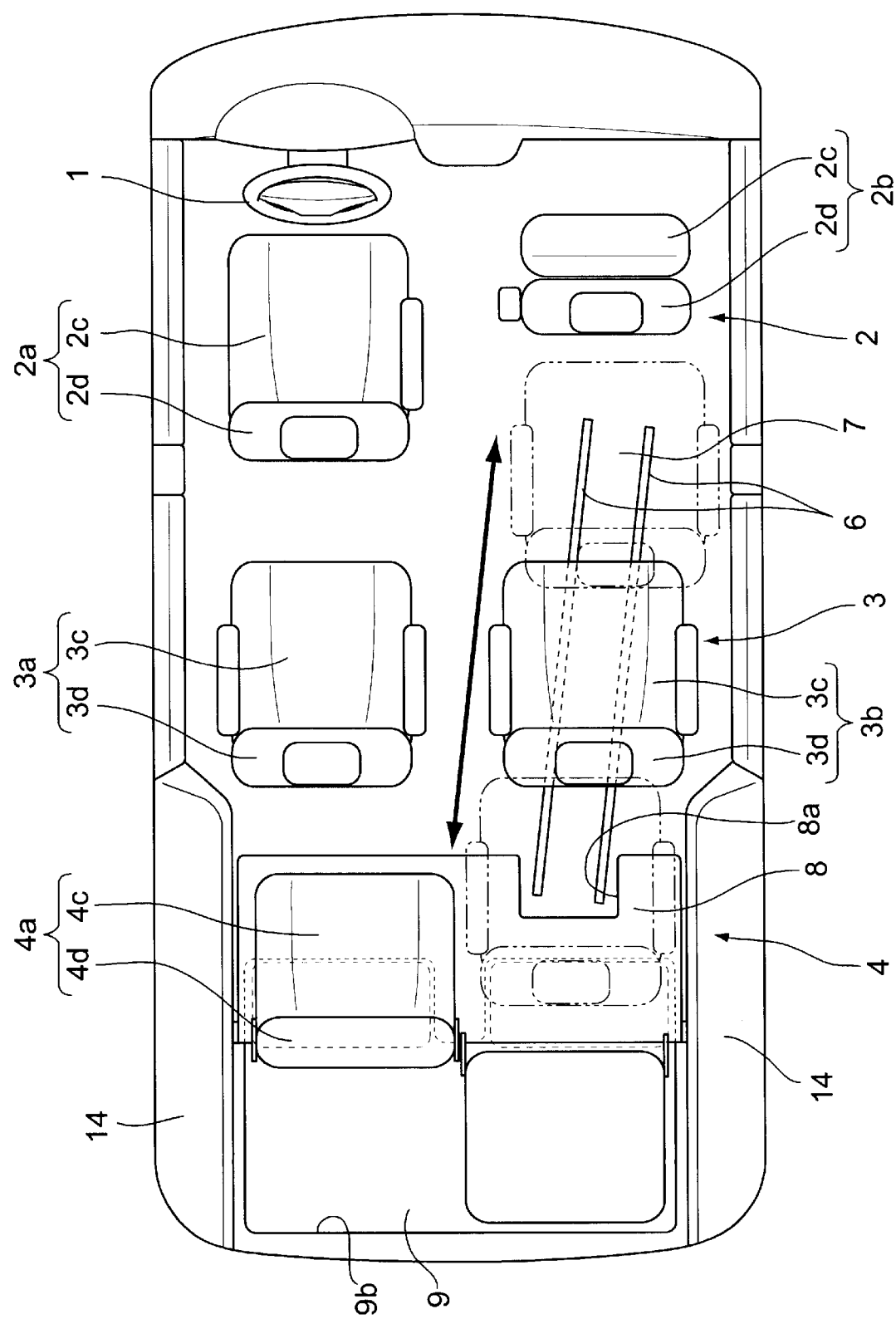
FIG. 9 is a plan view showing a state at the time when a second seat in the second row is moved longitudinally by a vehicular seat system in accordance with an embodiment of the present invention.

Furthermore, if the front-row passenger seat 2b is folded in this state as shown in FIGS. 8 and 9, the second seat 3b of the second-row seat 3 can be moved to a location near the side of the driver seat 2a, so that a passenger seated on the second seat 3b can communicate with the driver. Also, since the guide rails 6 are laid so that the front ends thereof are shifted toward the vehicle side, a wide space is secured between the driver seat 2a and the second seat 3b of the second-row seat 3 having been moved frontward. Therefore, a console box or the like can be provided in this space.

Figure 10:
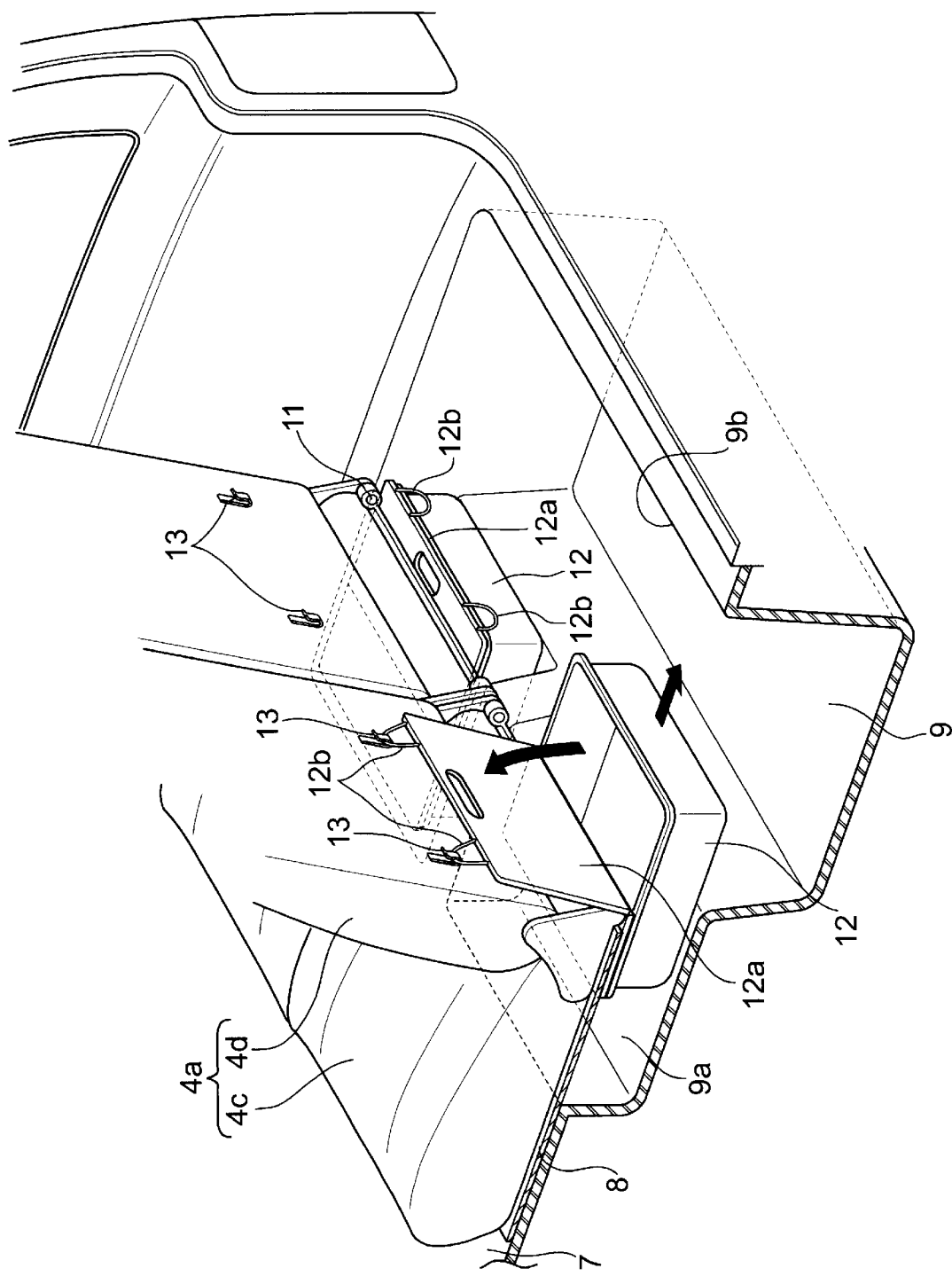
FIG. 10 is a partially cutaway perspective view showing a modification in which a drawer is provided in a seat storage chamber of a vehicular seat system in accordance with an embodiment of the present invention.

On the other hand, FIG. 10 shows a modification in which drawers 12 are provided in the step portion 9a of the seat storage chamber 9 having the shallow step portion 9a on the front side thereof so that small articles can be stored in these drawers 12. An openable cover 12a may be provided in the opening of the drawer 12. Also, handles 12b are provided on the cover 12a, and these handles 12b are hooked to hooks 13 provided on the back surface of the seat back 4d of the rearmost seat 4, by which the cover 12b can be held in an open state in order that the small articles can be put in or taken out of the drawer 12 more easily.

Although a vehicular seat system in which the seats 2, 3 and 4 are provided in three rows of front, second, and rearmost has been described in the aforementioned embodiment, it is a matter of course that the same seat system can be applied to a vehicle having seats of four or more rows.

As described above, according to the present invention, the second-row seat and the rearmost seat are divided into the first and second seats, the second seat of the rearmost seat is configured so as to be capable of being folded, and the second seat of the second-row seat is configured so as to be capable of being moved to the vicinity of the first seat of the rearmost seat. Therefore, the infants seated on the first seat of the second-row seat and the first seat of the rearmost seat can be taken care of and communicated with easily. Also, the front seat is divided into the driver seat and the front passenger seat, and the front passenger seat is also configured so as to be foldable so that the second seat of the second-row seat may be moved to the vicinity of the driver seat. Therefore, communication with the driver can be provided easily.

Also, since the seat storage chamber capable of storing either or both of the divided first and second seats is provided behind the rearmost seat, the second seat of the rearmost seat can be folded and stored in the seat storage chamber, so that the second seat of the second-row seat does not interfere with the second seat of the rearmost seat. Also, the first and second seats of the rearmost seat can be stored in the seat storage chamber, so that a wide luggage room can be formed at the rear part of the vehicle, and thus a large piece of luggage can be stored easily.

Further, the base plate of a size such as to be capable of covering the opening of the seat storage chamber is provided on the floor under the rearmost seat, the rear end of the base plate is hingedly fixed to a position near the front part of the seat storage chamber, the first seat of the rearmost seat is fixed onto the base plate, and the second seat is pivotally fixed to the rear part of the base plate by means of the pins. Therefore, by turning the base plate rearward around the hinges to store the first and second seats of the rearmost seat in the seat storage chamber, the base plate covers the opening of the seat storage chamber, so that a luggage room substantially flush with the floor can be provided. Thereby, luggage can be put in and taken out of the luggage room easily. Also, if the second seat of the rearmost seat is stored in the seat storage chamber, the bottom surface of the seat cushion of the stored second seat is substantially flush with the floor, so that a long piece of luggage can be stored easily.

Also, the guide rails for movably supporting the second seat of the second-row seat are laid on the floor, and the guide rails are inclined with respect to the running direction of the vehicle so that the front ends thereof are shifted toward the vehicle side and the rear ends thereof are shifted toward the vehicle center. Therefore, the second seat of the second-row seat can be moved smoothly in the longitudinal direction along the guide rails. If the second seat of the second-row seat is moved rearward, it can come closer to the first seat of the rearmost seat. Thereby, the infant seated on the first seat of the rearmost seat can easily be taken care of and communicated with, and also the second seat of the second-row seat can be prevented from interfering with the tire house located at the side of the second seat of the rearmost seat.

Further, if the second seat of the second-row seat is moved frontward, the second seat of the second-row seat shifts toward the vehicle side. Therefore, a wide space can be secured between the second seat of the second-row seat and the driver seat, so that a console box or the like can easily be provided in this space.

Also, the seat storage chamber is provided on the floor in a recessed manner so as to have the shallow step portion at the front part thereof, and the drawers are provided in the step portion so as to be openable freely. Therefore, by opening the drawer away from the step portion of the seat storage chamber, small articles can be stored in the drawer, by which small articles can be prevented from scattering in the luggage room during the running of the vehicle.

What is claimed is:

1. A vehicular seat system, comprising:
    at least three rows of seats, including a front seat, a second-row seat, and a rearmost seat, in which each of said second-row seat and said rearmost seat is divided into a first seat and a second seat, wherein the second seat of said rearmost seat is configured so as to be foldable toward the rear of the vehicle, wherein said second seat of the second-row seat is configured to be movable independent from said first seat of said second-row seat and is configured so as to be movable to the vicinity of the first seat of said rearmost seat by folding the second seat of the said rearmost seat toward the rear of the vehicle.

2. A vehicular seat system, comprising:
    at least three rows of seats, including a front seat, a second-row seat, and a rearmost seat, in which said front seat is divided into a driver seat and a front passenger seat, each of said second-row seat and said rearmost seat is divided into a first seat and a second seat and said passenger seat is configured so as to be foldable and said second seat of said rearmost seat is configured so as to be foldable toward the rear of the vehicle, wherein said second seat of the second-row seat is movable to the vicinity of one side of the driver seat and to the vicinity of one side of the first seat of the second-row seat, and wherein said second seat of said second-row seat is movable to the vicinity of one side of said first seat of said rearmost seat by folding said second seat of said rearmost seat toward the rear of the vehicle.

3. The vehicular seat system according to claim 1, wherein a seat storage chamber capable of storing either or both of the divided first and second seats is provided behind said rearmost seat.

4. The vehicular seat system according to claim 2, further comprising:
    a base plate adaptable to cover an opening of a seat storage chamber is disposed on a floor under said rearmost seat, the rear end of said base plate is hingedly fixed to a position near the front part of said seat storage chamber, the first seat of said rearmost seat is fixed onto said base plate, and the second seat is pivotally fixed to the rear part of said base plate by means of pins.

5. The vehicular seat system according to claim 1, wherein guide rails for movably supporting the second seat of said second-row seat are laid on the floor, and said guide rails are inclined with respect to the running direction of the vehicle so that the front ends thereof are shifted toward the vehicle side and the rear ends thereof are shifted toward the vehicle center.

6. The vehicular seat system according to claim 1, wherein said seat storage chamber is provided on the floor in a recessed manner so as to have a shallow step portion at the front part thereof, and a drawer is provided in said step portion so as to be openable freely.

7. A vehicular seat system, comprising:
    at least three rows of seats, including a front seat, a second-row seat, and a rearmost seat, wherein said second-row seat and said rearmost seat are divided into a first seat and a second seat, the second seat of said rearmost seat is configured so as to be capable of being folded, and the second seat of said second-row seat is configured so as to be capable of being moved to the vicinity of the first seat of said rearmost seat; and
    guide rails for movably supporting the second seat of said second-row seat that are disposed on a vehicle floor, wherein said guide rails are inclined with respect to the running direction of the vehicle so that the front ends thereof are shifted toward the vehicle side and the rear ends thereof are shifted toward the vehicle center.

8. The vehicular seat system according to claim 7, wherein a seat storage chamber capable of storing either or both of the divided first and second seats is provided behind said rearmost seat.

9. A vehicular seat system, comprising:
    at least three rows of seats, including a front seat, a second-row seat, and a rearmost seat, wherein said second-row seat and said rearmost seat are divided into a first seat and a second seat, the second seat of said rearmost seat is configured so as to be capable of being folded, and the second seat of said second-row seat is configured so as to be capable of being moved to the vicinity of the first seat of said rearmost seat;
    a seat storage chamber disposed on a vehicle floor in a recessed manner and having a shallow step portion at the front part thereof; and
    a freely openable drawer provided in said step portion.

* * * * *